United States Patent [19]

Bischoff et al.

[11] 4,231,976
[45] Nov. 4, 1980

[54] PROCESS FOR THE PRODUCTION OF CERAMIC PLUTONIUM-URANIUM NUCLEAR FUEL IN THE FORM OF SINTERED PELLETS

[75] Inventors: Klaus Bischoff, Kirchdorf; Richard W. Stratton, Windisch, both of Switzerland

[73] Assignee: Gesellschaft zur Forderung der Forschung an der Eidgenossischen Technischen Hochschule, Zurich, Switzerland

[21] Appl. No.: 886,462

[22] Filed: Mar. 14, 1978

[30] Foreign Application Priority Data

Mar. 24, 1977 [DE] Fed. Rep. of Germany ....... 2713108

[51] Int. Cl.$^2$ ............................................. G21C 21/00
[52] U.S. Cl. ..................................... 264/0.5; 176/90; 252/301.1 S
[58] Field of Search .................. 264/0.5; 252/301.1 S; 176/90

[56] References Cited

U.S. PATENT DOCUMENTS

| | | | |
|---|---|---|---|
| 3,310,386 | 3/1967 | Lloyd | 252/301.1 S |
| 3,531,416 | 9/1970 | Akutsu et al. | 252/301.1 S |
| 3,714,056 | 1/1973 | Tallent | 252/301.1 S |
| 3,728,274 | 4/1973 | Gerontopoulos et al. | 264/0.5 |
| 3,846,520 | 11/1974 | Bruijn et al. | 264/0.5 |
| 3,949,027 | 4/1976 | Flipot et al. | 176/90 X |
| 4,020,131 | 4/1977 | Feraday | 264/0.5 |
| 4,048,090 | 9/1977 | Hannerz | 264/0.5 |

*Primary Examiner*—Leland A. Sebastian
*Attorney, Agent, or Firm*—Watson, Cole, Grindle & Watson

[57] ABSTRACT

Ceramic plutonium-uranium fuels are made by sintering wet-chemical microspheres of plutonium-uranium solid-solution oxides, carbides, nitrides, or the like, or by sintering separate plutonium- and uranium-compound microspheres mixed together, the uranium compound alternatively being in a fine-grained to pulverulent form.

31 Claims, No Drawings

PROCESS FOR THE PRODUCTION OF CERAMIC PLUTONIUM-URANIUM NUCLEAR FUEL IN THE FORM OF SINTERED PELLETS

BACKGROUND OF THE INVENTION

1. Field of the Invention

This invention concerns a process for the production of ceramic plutonium-uranium nuclear fuel in the form of sintered pellets made from a fine-grained starting material containing plutonium and uranium as oxide, carbide or nitride.

2. Description of the Prior Art

In the production of ceramic nuclear fuel, i.e. ceramic material from uranium, plutonium or thorium, or mixtures of these metals, or solid solutions of such mixtures of metals, wherein all components are present in the form of oxides, nitrides or carbides, conventionally the usually cylindrical fuel pellets are obtained by sintering pressed "green powders", as this is described, e.g., in "Nuclear Energy Maturity. Proceedings of the European Nuclear Conference Vol. 7 'Fuel Fabrication'. Progress in Nuclear Energy, Pergamon Press (1976)".

In the case of plutonium-containing fuel, as, e.g., uranium with about 3% plutonium for the production of oxide for use in a Light Water Reactor (LWR) Pressurised Water Reactor, PWR), Boiling Water Reactor (BWR) or Advanced Gas-cooled Reactor (AGR), or uranium with 10–14% plutonium in the form of mixtures of oxide, carbide or nitride for use in a Fast Breeder Reactor (FBR) cooled with liquid sodium or a gas, it is usual to blend the two pulverulent components which separately contain the uranium and plutonium in the form of oxide, or to mix the uranium oxide and the plutonium oxide together with finely divided carbon in order to obtain the carbide and the nitride.

From these starting powder mixtures cylindrical green pellets in hydraulic or mechanical presses are pressed. The green pellets are then baked in order to result in a dense sintered pellet. In the case where in the manufacture of the green pellets the oxide was mixed with carbon, a preliminary heating step may be interposed before the baking during which the carbon reacts with the oxides of plutonium and uranium and forms the carbide. The thus obtained carbide material is then granulated by comminution and ground and finally, as before, pressed and sintered in order to obtain the required final density.

The final sintering used with green pellets mixed from oxides or with the re-shaped carbide pellets is important for the manufacture of dense pellets with a homogeneous distribution of plutonium in the uranium structure. This homogenisation takes place by self-diffusion and is necessary so that no localised regions of above average plutonium concentration should occur.

The good sintering properties required for achieving a high final density and a complete diffusion of the plutonium in the uranium matrix are dependent on the characteristics of the powder forming the initial mixture, such as particle size, particle surface, particle shape, flowability and the quality of the mixture itself. In order to obtain sintered pellets of high quality, the uranium or plutonium oxide powder with or without carbon, or the separately won powders of uranium and plutonium carbides must be ground optimally and mixed extremely carefully. In certain cases, the final grinding and the mixing of the powders are undertaken in a single process step while in other cases the powders are first ground to the required quality and then mixed. The grinding and mixing of plutonium-containing powders give rise to difficulties.

Because of its toxicity, its radioactivity and the danger of ingestion, plutonium material can only be handled and prepared under the strictest controls in a sealed room, such as a radiologically protected room or in an α-tight cell. Some industrial nations have issued fabrication guidelines for the production of plutonium-containing fuels which comply with the above-mentioned principles.

In the manufacture of ceramic fuel pellets, it is particularly the plutonium-containing dust arising in the preparation of the powder that leads to special difficulties, because without special precautionary measures the operating personnel receive, or could receive, impermissibly high radiation doses. Such radiation fields are also caused in part by a byproduct of plutonium, namely americium, which emits hard gamma rays and can cause a direct irradiation of the service personnel or the maintenance personnel through the dust which coats the apparatus and the interior surfaces of the radiation-protected rooms into which latter personnel must from time to time enter in protective clothing for the maintenance of apparatus. Further difficulties are caused by lost plutonium, i.e., plutonium adhering to surfaces and retained in the filters.

It is anticipated that these problems will increase, particularly because of the increase in the radioactivity of plutonium caused by the longer residence time (higher burn-up) in "producing" reactors, to which one should then still add the spontaneous neutron emission (spontaneous fission) of Pu-238 ($\alpha$, n) and the gamma emission of plutonium 236 ($\gamma$) which increases with increasing recovery of plutonium materials.

Spherical fuel particles may be produced in wet chemical processes. Of these, the most important are:

The Sol-gel process which has been described, e.g., in:

(L1) Proc. Panel for ceramic nuclear fuels, 6–10 May 1968 Vienna, IAEA "Sol-gel processes for ceramic nuclear fuels";

The precipitation process, known from:

(L2) U.K. Patent Spec. No. 1,175,834 (24.12.1967) "Improvements in or relating to the chemical production of metal containing materials as particles or other configurations" and (L3) Jülich Report, Jül. 1229, 1975;

The internal gelation process, described in:

(L4) German Patent Spec. No. 2,059,093 "Process for the production of spherical particles which contain a metallic oxyhydrate, metallic oxyhydrate with carbon . . . , from an aqueous solution" and in (L5) Förthmann R. et al, in Jül-655-RW (April 1970) "Investigation on the preparation of $UO_2$ microspheres by internal gelation of a $UO_2$ sol and from a uranium (VI) solution", and The EIR carbide process which is described in (L6) Stratton R, and Bischoff K in Op. cit ref. 1, vol. 3 "The mixed carbide fuel programme at EIR".

These wet chemical or gelation processes may all be used for the purpose of directly obtaining ceramic sintered material from uranium and plutonium, i.e. without grinding, mixing and powder pressing, in the form of microspheres of oxide, carbide, carbide or nitride for use as fuel in reactors. Such a special process is described e.g. in Swiss Patent Specification 581,890 (RE- ACTOR CENTRUM NEDERLAND) "Process for converting a spherical sol-gel fissile material by sintering to a spherical nuclear fuel material containing oxide, carbide or carbonitride".

Accordingly, ceramic uranium-plutonium nuclear fuel is available in the form of microspheres producible by a wet chemical method or in the form of sintered pellets which latter are significantly more advantageous in use than microspheres but the manufacture of which is difficult and has problems that can only be solved by corresponding expenditure.

SUMMARY OF THE PRESENT INVENTION

Accordingly, the task of the invention is to find a better process for the production of sintered pellets from ceramic uranium plutonium nuclear fuel wherein the above-described difficulties are mitigated and which makes it possible to produce uranium-plutonium sintered pellets in a manner which is advantageous in other respects also.

The solution of the task consists according to the invention in a process for the production of a plutonium uranium ceramic fuel wherein green pellets are formed by pressing from:

(i) a mixture of (a) an oxide, finely divided carbon-containing oxide, carbide, nitride, oxycarbide, or carbonitride of plutonium, in the form of microspheres obtained by a wet chemical process, and (b) a like compound of uranium in a form selected from such microspheres and fine-grained to pulverulent materials; or (ii) a like compound of a plutonium-uranium solid solution of which at least 1% is plutonium, in the form of microspheres obtained by a wet chemical process, alone or in admixture with a material selected from the said plutonium-compound microspheres, the said uranium-compound microspheres and the said fine-grained to pulverulent materials, and the green pellets are subjected to a heat treatment that includes a sintering to final density.

Since in the process according to the invention, the plutonium remains in liquid form until that stage of the process in which the microspheres are formed, and in the known gelation processes the microspheres may be obtained in the correct size via the feed nozzles used in such processes, grinding of the plutonium containing particles to their optimum size is no longer necessary. The microspheres obtained by a wet chemical process are only subject to processes such as washing, drying, mixing, pressing and sintering until the end-product of the ceramic plutonium uranium sintered pellets is obtained, which processes are either dust-free or are at most low-dust processes wherein plutonium losses are also significantly reduced. In this way, the drawbacks associated with conventional production processes are eliminated in a direct way. In addition, the process according to the invention affords still further advantages which among others and above all are of significance in obtaining ceramic sintered pellets of high quality, such as:

the particles to be processed are available in the form of microspheres which, because of their particularly good flowability, may be mixed easily so that the required homogeneity of the mixture is ensured;

the wet chemical production of the starting material particles makes it possible to reduce the americium content of plutonium by chemical separation directly before the fabrication of the fuel elements;

the green plutonium particles, or uranium and plutonium particles in the form of a standard mixture, may be produced directly in a chemical reprocessing plant;

by a special manner of operating the pelletising process sintered pellets of any arbitrary "low" desired density may be produced.

For the production of uranium-plutonium carbide sintered pellets, carbon-containing plutonium or plutonium-uranium microspheres can be produced by a wet chemical route wherein finely divided carbon in suspension is added to the feed solution. In a heat treatment, i.e. of the microspheres, reaction sintering, the carbide is then formed by a carbon-thermal reduction. The plutonium carbide microspheres may be mixed with the uranium carbide microspheres or with fine-grained to pulverulent uranium carbide in such a ratio that the desired final content of uranium and plutonium is obtained in the sintered pellets.

DESCRIPTION OF THE PREFERRED EMBODIMENTS

The following graphical representation schematically shows as examples of embodiment four different routes by which according to the process of the invention, sintered pellets of mixed uranium-plutonium oxide, a mixed carbide or a mixed nitride are obtained from starting materials. From sols, suspensions or solutions of uranium and plutonium, which may contain finely divided carbon, xerogels in the form of microspheres are produced according to the known sol-gel process wherein here and in what follows the final product of the wet chemical process is to be understood by the term "xerogel". The starting material for the plutonium component consists exclusively of such xerogels while the starting material for the uranium component may consist of xerogels or of a fine-grained to pulverulent material.

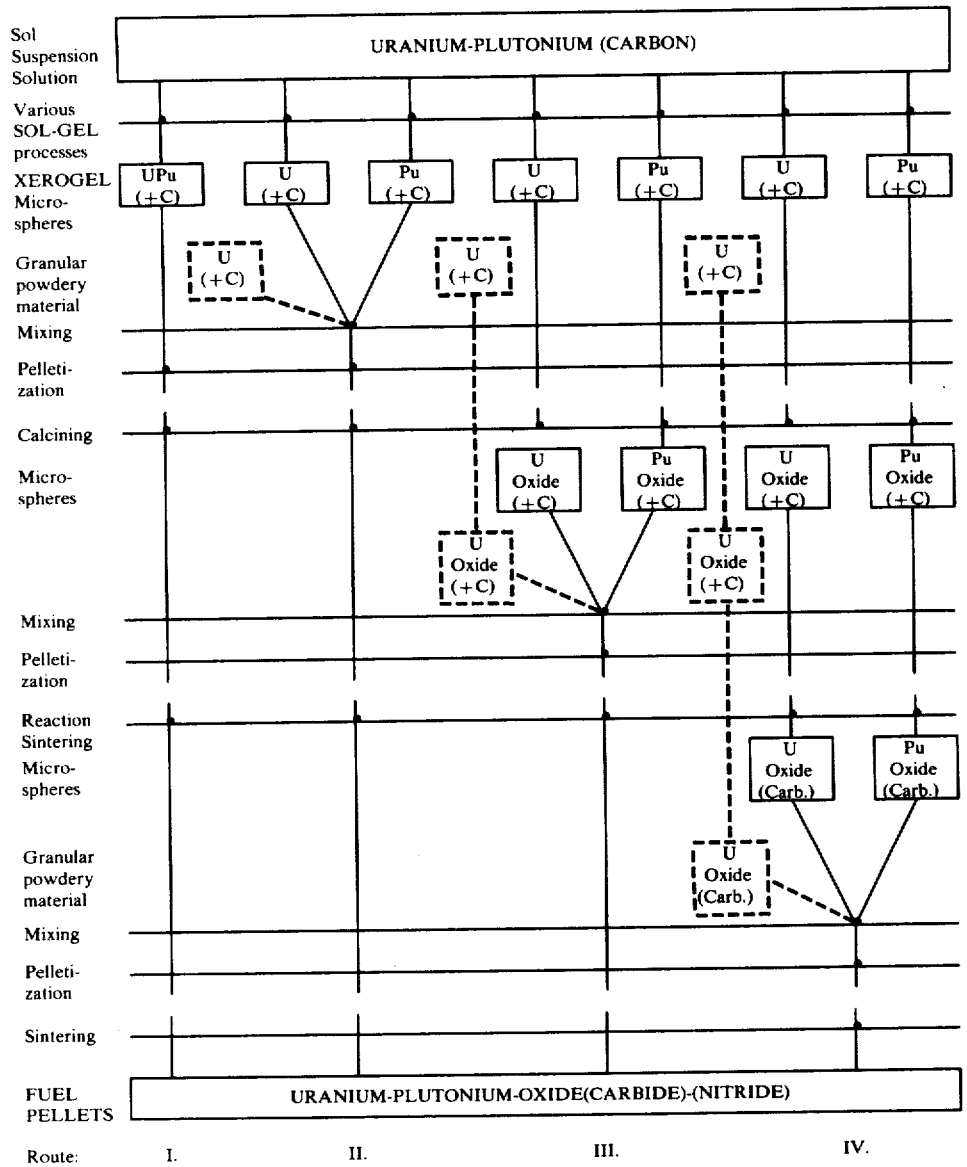

Route I One starts with a uranium-plutonium xerogel which contains finely divided carbon for the production of carbide pellets in the microspheres.

The xerogel microspheres are pelletised and the green pellets are calcined in a pre-heating step and then reaction sintering at a higher temperature is undertaken whereby to bring the production of sintered pellets by this Route I to its conclusion.

Route II: One starts with microspheres of a plutonium xerogel, and with microspheres of a uranium xerogel, or with a fine-grained to pulverulent uranium material, both types of particles being with or without carbon. The two types of particles are mixed together in a quantity ratio which corresponds to the desired uranium and plutonium content of the finished sintered pellet. Then the particle mixture is pelletised. The obtained green pellets are calcined in a pre-heating step and then subjected at a higher temperature to reaction sintering. Route III: As in the second route, here also the start is from microspheres of a plutonium xerogel and from microspheres of a uranium xerogel or from a fine-grained to pulverulent uranium material wherein the plutonium and uranium materials may contain carbon. If the starting materials are microspheres of uranium and plutonium then the microspheres are calcined, each type separately, and then the calcined microspheres are mixed together in a quantity ratio dependent upon the final product. The microsphere mixture is pelletized and the pellets are subjected to reaction sintering that takes place at a higher temperature. If the starting material is plutonium microspheres and a fine-grained to pulverulent uranium material, then the uranium material is mixed with the calcined plutonium microspheres in the prescribed quantity ratio. The particle mixture is then pelletized and the pellets are subject to reaction sintering. Route IV: The starting materials are once again a plutonium xerogel and a uranium xerogel or a fine-grained to pulverulent uranium material. When microspheres of uranium xerogel are used, which may contain finely divided carbon, and microspheres of a plutonium xerogel with or without carbon, then each type of microsphere is separately calcined in a pre-heating step. The calcined uranium microspheres and the calcined plutonium microspheres are then, again separately for each type, subjected to reaction sintering. The thus pre-sintered uranium microspheres and plutonium microspheres are then mixed as described for the other routes and then the microsphere mixture is pelletized and the obtained green pellets are finally sintered again.

When a fine-grained to pulverulent material is used as the uranium component, then either the uranium material that is equivalent to the calcined uranium microspheres is subjected to reaction sintering and then mixed with the plutonium microspheres treated in reaction sintering, or a fine-grained to pulverulent uranium material corresponding to the uranium microspheres treated by reaction sintering is mixed directly with plutonium microspheres treated in the reaction sintering. After the mixing, pelletization and final sintering of the mixture take place.

From the initial xerogel, Route I has the fewest process steps, namely only pelletisation, calcining and reaction sintering, wherein the calcining and the reaction sintering follow each other in a heat treatment of the green pellets. In routes II and III mixing is added. Route II begins with the mixing and then takes place as route I. In Route III mixing takes place first only after calcining which is the beginning of this route. In Route IV the initial stages of calcining and reaction sintering may take place during heat treatment in successive steps. After mixing and pelletisation a final sintering is added as a further process step. Naturally, the production of xerogels is also significant.

A few examples of embodiment of the process according to the invention are treated in greater detail in what follows.

EXAMPLE 1

Sintered pellets from a mixed uranium-plutonium-oxide particularly for light water reactors: As starting materials a uranium xerogel and a plutonium xerogel are used. The uranium xerogel is produced by a sol-gel process corresponding to the so-called "Jülich H-Process"(see L5) and the plutonium xerogel is made according to the so-called "EIR Sol-Gel Process" which is described in:

(L7) Bischoff K. et al EIR Report No. 236,1973
"Sol-Gel Processes for Carbide Preparation"

To disperse the feed solutions into droplets of 10 to 50 μm diameter a two-jet nozzle is used as is described e.g. in:

(L8) Wymer R.G.
IAEA, Vienna 1968
"Laboratory and Engineering Studies of Sol-Gel Processes at ORNL".

The uranium and plutonium xerogels are available in the form of microspheres with a diameter of 5 to 25 μm. It is important that the size distribution of the microspheres in the uranium xerogel and the plutonium xerogel should be the same and that in each xerogel the mean diameter should lie between 10 and 15 μm.

5 g of plutonium oxide xerogel and 162 g of uranium oxide xerogel were well mixed together. From the flowable microspheres mixture green pellets were pressed in a usual pelletisation apparatus in the desired size, e.g., with a diameter of 9 mm, with the density of the pressed green pellets being not less than $4.0 \text{ g cm}^{-3}$. Thus, the production of green pellets takes place here without addition of any binding material.

The green pellets are then calcined at 500° C. in a reducing gas of 80% argon and 20% hydrogen and then are sintered in argon at 1400°–1600° C. to the final pellets consisting of mixed oxides with a typical density of 95—98% of the theoretical density (Reaction sintering).

The sintered pellets are here produced according to the previously illustrated Route II.

EXAMPLE 2

Sintered pellets from a mixed uranium-plutonium oxide, particularly for LW reactors.

A plutonium xerogel and a uranium oxide powder are the starting materials. The plutonium xerogel is produced as described in Example 1. The uranium oxide powder must have certain flowability which in this case is ensured by a grain size distribution in the powder of between 50 and 50 μm.

5 g of the plutonium oxide xerogel described in Example 1 and 162 g of uranium oxide powder are well mixed in a tumble mixer. The production of green pellets from the thus obtained mixture and the subsequent heat treatment take place in the same manner as in Example 1.

EXAMPLE 3

Sintered pellets from a mixed oxide of uranium and plutonium with a ratio of plutonium to heavy metal of 0.3, particularly for FB-reactors:

Firstly, a uranium-plutonium xerogel is made, preferably by a sol-gel process corresponding to a so-called "Gel Precipitation Process" (See L2). The feed solution, which has been previously prepared for the production of xerogel microspheres, has the same ratio of plutonium to heavy metal as that of the desired sintered pellet, thus here 0.3. It is to be emphasized that in this case the mean size of the xerogel microspheres is not critical since the homogeneity range for uranium and plutonium in no way depends here on the size of the feed microspheres. Expediently, microspheres with a diameter in the range of 20 to 100 μm are produced. To obtain a suitable dispersing of the feed solution in practice advantageously a sextuple two-jet nozzle is selected.

The production of green pellets and the subsequent heat treatment are undertaken in the same manner as in Example 1. This production of sintered pellets corresponds to Route I mentioned above.

EXAMPLE 4

Sintered pellets from a mixed carbide of uranium and plutonium, particularly for FB reactors: A uranium-plutonium xerogel is used as feed material for the production of green pellets, the microspheres of which contain about 12 weight parts, related to the total weight, of finely divided carbon black.

The uranium-plutonium (carbon xerogel is preferably produced according to the "EIR Sol-Gel Process" (see L7) already mentioned in Example 1.

98.1 g of the feed solution containing 0.112 mol/kg of plutonium, 0.637 mol/kg of uranium and carbon in the form of carbon black of 2.397 mol/kg are dispersed into droplets of a diameter of 40 to 200 μm and converted into a xerogel. Since, as in Example 2, the mean size of the microspheres is not critical for the homogeneity, the dispersing of the feed solution can be undertaken with a conventional pressure nozzle.

From the uranium-plutonium (carbon) xerogel, green pellets are pressed at a pressure of about 6 tonnes/cm².

The green pellets are calcined, subjected to a carbon reduction and sintered.

The principal advantage in this preferred embodiment lies in that the carbon reduction and the sintering takes place in a single operation, thus only one single process step is required for this.

In practice, the green pellets are calcined in flowing gas containing 80% argon and 20% hydrogen at 500° C. and then follows a heat treatment in flowing argon at 1700° to 1800° C.

Mixed carbide fuel pellets with a density of a constant 95% of the theoretical density are achieved.

This production mode corresponds again to Route I.

EXAMPLE 5

Sintered pellets from a mixed oxide of uranium and plutonium particularly for FB reactors:

The green pellets are produced from uranium oxide microspheres and plutonium oxide microspheres wherein the microspheres of both types have a diameter of 5-25 μm. The uranium oxide microspheres are produced by the so-called "ORNL Sol-Gel Process" which is described in:

(L9) Finney B.C. et al.
ORNL-4802, 1972
"Sol-Gel Process Engineering-Scale Demonstration of the Preparation of High-Density UO₂ Microspheres".

The plutonium oxide microspheres are produced by a sol-gel process which is described in:

(L10) Lloyd M.H. et al.
Nucl. Appln. 5, 1968
"A Sol-Gel Process for preparing dense forms of PuO₂".

The two kinds of microspheres are mixed in a ratio of one weight part of plutonium moxide microspheres and three weight parts of uranium oxide microspheres and from the mixture of microspheres green pellets are pressed in a conventional pelletising press.

The subsequent heat treatment of the green pellets is in the form of a reaction sintering in a flowing gas of 96% argon and 4% hydrogen at 1200° to 1300° C. Uranium-plutonium mixed oxide sintered pellets are obtained with a density of 95-98% of the theoretical density. This process corresponds to the previously illustrated general Route III.

We claim as our invention:

1. A process for the production of a plutonium-uranium ceramic fuel wherein green pellets are formed by pressing from:
    (i) a mixture of (a) an oxide, finely-divided carbon-containing oxide, carbide, nitride, oxycarbide, or carbonitride of plutonium, in the form of microspheres obtained by a wet chemical process, and (b) a like compound of uranium in a form selected from such microspheres and fine-grained to pulverulent materials; or
    (ii) a like compound of a plutonium-uranium solid solution of which at least 1% is plutonium, in the form of microspheres obtained by a wet chemical process, alone or in admixture with a material selected from the said plutonium-compound microspheres, the said uranium-compound microspheres, and the said fine-grained to pulverulent materials, and the green pellets are subjected to a heat treatment that includes a sintering to final density.

2. A process according to claim 1 wherein, for the production of sintered pellets with a specified plutonium to heavy metal ratio, xerogel microspheres of a solid solution of uranium plutonium obtained in a gelation process are pressed to green pellets with the same plutonium to heavy metal ratio and the green pellets are calcined at a certain temperature and sintered at a higher temperature in the course of a heat treatment.

3. A process according to claim 2, wherein xerogel microspheres produced by a gel-precipitation process are used for the production of uranium-plutonium mixed oxide pellets.

4. A process according to claim 3, wherein the xerogel microspheres of plutonium and uranium have mixed or uniform diameter of 20 to 100 μm.

5. A process according to claim 2, wherein the green pellets are calcined in a reducing gas of 80% argon and 20% hydrogen at 500° C. and subsequently are sintered in an oven at 1400° to 1600° C.

6. A process according to claim 5, wherein the green pellets are sintered to 95-98% of the theoretical density.

7. A process according to claim 2, wherein xerogel microspheres of uranium-plutonium made according to the "EIR sol-gel process" are used for the production of uranium-plutonium mixed carbide pellets, wherein the microspheres contain about 12 weight parts, related to the total weight, of finely divided carbon-black and have diameters lying in the range of 20 to 200 μm.

8. A process according to claim 7, wherein the green pellets are calcined in flowing gas of 20% hydrogen and 80% argon at about 500° C. and then are subjected to a heat treatment in flowing argon of 1700° to 1800° C., during which a carbon reduction takes place and the pellets are sintered.

9. A process according to claim 8, wherein the pellets are sintered to 95% of the theoretical density.

10. A process according to claim 1, wherein for the production of sintered pellets with a specified plutonium to heavy metal ratio, a xerogel microsphere of uranium obtained in a gelation process or fine-grained to pulverulent uranium material is used in a weight ratio determined by the plutonium to heavy metal ratio and are mixed with xerogel microspheres of plutonium obtained in a gelation process, the uranium particles and the plutonium microspheres having at least approximately the same size distribution and about the same mean diameter, and wherein the particle mixture is pressed to green pellets, and in the course of a heat treatment the green pellets are calcined at a specified temperature and sintered at a higher temperature.

11. A process according to claim 10, wherein the uranium microspheres or the fine-grained to pulverulent material and the plutonium microspheres pressed to green pellets have particle diameters lying in the range of 5 to 25 μm and a mean diameter of 10 to 15 μm.

12. A process according to claim 10, wherein uranium xerogel microspheres made by the "Jülich H-Process" and plutonium xerogel microspheres produced by an "EIR Sol-Gel Process" are used for the production of uranium-plutonium mixed oxide pellets, particularly for LW reactors.

13. A process according to claim 12, wherein the green pellets are calcined in a reducing gas of 80% argon and 20% hydrogen at about 500° C. and then sintered in argon at 1400° to 1600° C.

14. A process according to claim 13, wherein the pellets are sintered to 95-98% of the theoretical density.

15. A process according to claim 1, wherein the calcined xerogel microspheres of plutonium obtained in a gelation process and the calcined xerogel microspheres of uranium obtained in a gelation process or a corresponding fine-grained to pulverulent uranium material are mixed together in a certain weight ratio, the uranium particles and the plutonium microspheres having at least approximately the same size distribution and about the same mean diameter, and wherein the mixture is pressed to green pellets and the green pellets are sintered at a higher temperature.

16. A process according to claim 15, wherein the uranium particles and the plutonium microspheres have a diameter in the range of 5 to 25 μm.

17. A process according to claim 15, wherein uranium oxide microspheres produced according to an "ORNL Sol-Gel Process" and plutonium oxide microspheres produced by a $PuO_2$ Sol-gel process are used for the production of uranium-plutonium mixed oxide pellets, particularly for FB reactors.

18. A process according to claim 15, wherein the green pellets are sintered in a flowing gas of argon and 4% hydrogen at 1200° to 1300° C.

19. A process according to claim 18, wherein the pellets are sintered to 95-98% of the theoretical density.

20. A process according to claim 1, wherein the plutonium xerogel microspheres obtained in a gelation process are calcined at a specified temperature and the thus obtained plutonium oxide microspheres are subjected to reaction sintering at a higher temperature; that the sintered plutonium microspheres are mixed with microspheres or uranium with a fine-grained to pulverulent uranium material, both kinds of particles having at least approximately the same size distribution and about the same mean diameter, and wherein green pellets are pressed from the mixture and the green pellets are subjected to final sintering.

21. A process according to claim 20, wherein the uranium xerogel microspheres obtained in a gelation process are calcined at a specified temperature and the thus obtained uranium microspheres are subjected to reaction sintering at a higher temperature and the sintered uranium oxide microspheres are mixed with the reaction-sintered plutonium microspheres.

22. A process according to claim 20, wherein the reaction-sintered plutonium microspheres are mixed with a fine-grained to pulverulent uranium material which is calcined and/or reaction sintered.

23. A low-dust process for the production of a homogeneous plutonium-uranium ceramic fuel which comprises the steps of
 (a) mixing together a plutonium-containing compound and a uranium-containing compound, said plutonium-containing compound being in the form of microspheres produced by a wet chemical process and being selected from the group consisting of an oxide, a carbon-containing oxide, a carbide, a nitride, an oxycarbide, and a carbonitride; and said uranium-containing compound being in the form of either microspheres or else a fine-grained to pulverulent form of a uranium compound selected from the group consisting of an oxide, a carbon-containing oxide, a carbide, a nitride, an oxycarbide, and a carbonitride,
 (b) pressing the mixture formed in step (a) to form green pellets, and
 (c) heat treating the green pellets in step (b) to form a plutonium-uranium ceramic fuel.

24. The low-dust process in accordance with claim 23 wherein said uranium-containing compound is in the form of microspheres, and wherein both said plutonium-containing compound microspheres and said uranium-containing compound microspheres are separately calcined prior to being mixed together in said step (a).

25. The low-dust process in accordance with claim 24 wherein said uranium-containing compound microspheres include finely divided carbon.

26. The low-dust process in accordance with claim 25 wherein prior to the mixing together of said plutonium-containing compound microspheres and subsequent to the separate calcinations of said microspheres, said microspheres are separately presintered.

27. The low-dust process in accordance with claim 23 wherein said uranium-containing compound is in the form of a fine-grained to pulverulent compound, and wherein said plutonium-containing compound is calcined prior to being mixed together with said uranium-containing compound in step (a).

28. The low-dust process in accordance with claim 23 wherein said uranium-containing compound is in the form of a fine-grained to pulverulent compound, and wherein said plutonium-containing compound microspheres are pre-sintered prior to being mixed together with said uranium-containing compound in said step (a).

29. The low dust process in accordance with claim 28 wherein said uranium-containing compound is in the form of a fine-grained to pulverulent compound is pre-sintered prior to being mixed with said pre-sintered plutonium-containing compound.

30. A low-dust process for the production of a homogeneous plutonium-uranium ceramic fuel which comprises the steps of
 (a) forming microspheres of a plutonium-uranium solid solution by a wet chemical process, said plutonium-uranium solid solution containing at least 1% plutonium, said plutonium-uranium solid solution containing plutonium compounds selected from the group consisting of an oxide, a carbon-containing oxide, a carbide, a nitride, an oxycarbide, and a carbonitride, and said plutonium-uranium solid solution containing uranium compounds selected from the group consisting of an oxide, a carbon-containing oxide, a carbide, a nitride, an oxycarbide, and a carbonitride,
 (b) pressing the microspheres in step (a) to form green pellets, and
 (c) heat treating the green pellets in step (b) to form a plutonium-uranium ceramic fuel.

31. A low-dust process for the production of a homogeneous plutonium-uranium ceramic fuel which comprises the steps of
 (a) mixing together (i) microspheres obtained from a wet chemical process of a plutonium-uranium solid solution, said solid solution containing at least 1% plutonium, said plutonium-uranium solid solution containing plutonium compounds selected from the group consisting of an oxide, a carbon-containing oxide, a carbide, a nitride, an oxycarbide, and a carbonitride, and said plutonium-uranium solid solution containing uranium compounds selected from the group consisting of an oxide, a carbon-containing oxide, a carbide, a nitride, an oxycarbide, and a carbonitride, (ii) microspheres of plutonium-containing compounds produced by a wet chemical process, said plutonium-containing compounds selected from the group consisting of an oxide, a carbon-containing oxide, a carbide, a nitride, an oxycarbide, and a carbonitride, and (iii) a uranium-containing compound either in microsphere form or else a fine-grained to pulverulent form, said uranium-containing compound selected from the group consisting of an oxide, a carbon-containing oxide, a carbide, a nitride, an oxycarbide, and a carbonitride, (b) pressing the mixture formed in step (a) to form green pellets, and
(c) heat treating the green pellets in step (b) to form a plutonium-uranium ceramic fuel.

* * * * *